United States Patent [19]

McCormick

[11] 4,202,452
[45] May 13, 1980

[54] SUPPORTING RACK FOR BREAKABLE ARTICLES

[76] Inventor: Joseph R. McCormick, P.O. Box 846, Orange, Tex. 77630

[21] Appl. No.: 904,310

[22] Filed: May 9, 1978

[51] Int. Cl.² ............................................. B65D 85/48
[52] U.S. Cl. ...................................... 211/41; 410/119; 410/125; 206/448; 206/454; 248/1; 269/22
[58] Field of Search ............... 211/41; 248/1; 206/448, 206/454, 522; 214/10.5 D; 269/20, 22, 275; 105/467, 468, 490, 491

[56] References Cited

U.S. PATENT DOCUMENTS

| | | | |
|---|---|---|---|
| 2,379,220 | 6/1945 | Engelhart | 269/22 |
| 2,815,861 | 12/1957 | Schodorf | 211/13 |
| 2,852,463 | 9/1958 | Gutzmer | 269/22 X |
| 2,939,586 | 6/1960 | Domaine | 211/41 |
| 2,946,453 | 7/1960 | Pityo | 211/41 |
| 2,953,253 | 9/1960 | Henderson et al. | 211/41 |
| 3,098,455 | 7/1963 | McElroy et al. | 105/491 |
| 3,184,070 | 5/1965 | Pirlot | 211/41 |
| 3,412,867 | 11/1968 | Barkow | 211/41 |
| 3,424,487 | 1/1969 | Pector et al. | 294/67 |
| 3,596,755 | 8/1971 | Bondy et al. | 211/41 X |
| 3,719,284 | 3/1973 | Rasmusson et al. | 211/50 |
| 3,963,122 | 6/1976 | Pader | 206/454 X |
| 4,033,597 | 7/1977 | Boyer | 211/41 X |
| 4,065,116 | 12/1977 | Lindenberg et al. | 269/22 |
| 4,093,251 | 6/1978 | Boyer | 211/41 X |

FOREIGN PATENT DOCUMENTS

| | | | |
|---|---|---|---|
| 1021072 | 2/1966 | United Kingdom | 206/522 |
| 248530 | 12/1969 | U.S.S.R. | 206/454 |
| 372128 | 5/1973 | U.S.S.R. | 206/454 |

OTHER PUBLICATIONS

Western Electric Technical Digest No. 16, Oct. 1969, "Fixture for Holding Parts by Rubber Tubbing and Releasing Same by Vacuum" by Emery & Esseluma, pp. 5 and 6.

Primary Examiner—Thomas J. Holko
Attorney, Agent, or Firm—Fleit & Jacobson

[57] ABSTRACT

A rack for supporting curved or flat glass, such as multi-curved automobile windshields, utilizes upstanding support members in combination with pneumatically inflatable hose to support the windshields in a vertical position. The hose is arranged in a serpentine fashion over the exterior surface of each of the upstanding members, so that a hose segment is facing each major surface of the windshield. With no pressure in the hose, the glass is arranged in the rack and the hose is inflated causing the hose to expand and contact the glass, thereby supporting and cushioning the glass.

12 Claims, 4 Drawing Figures

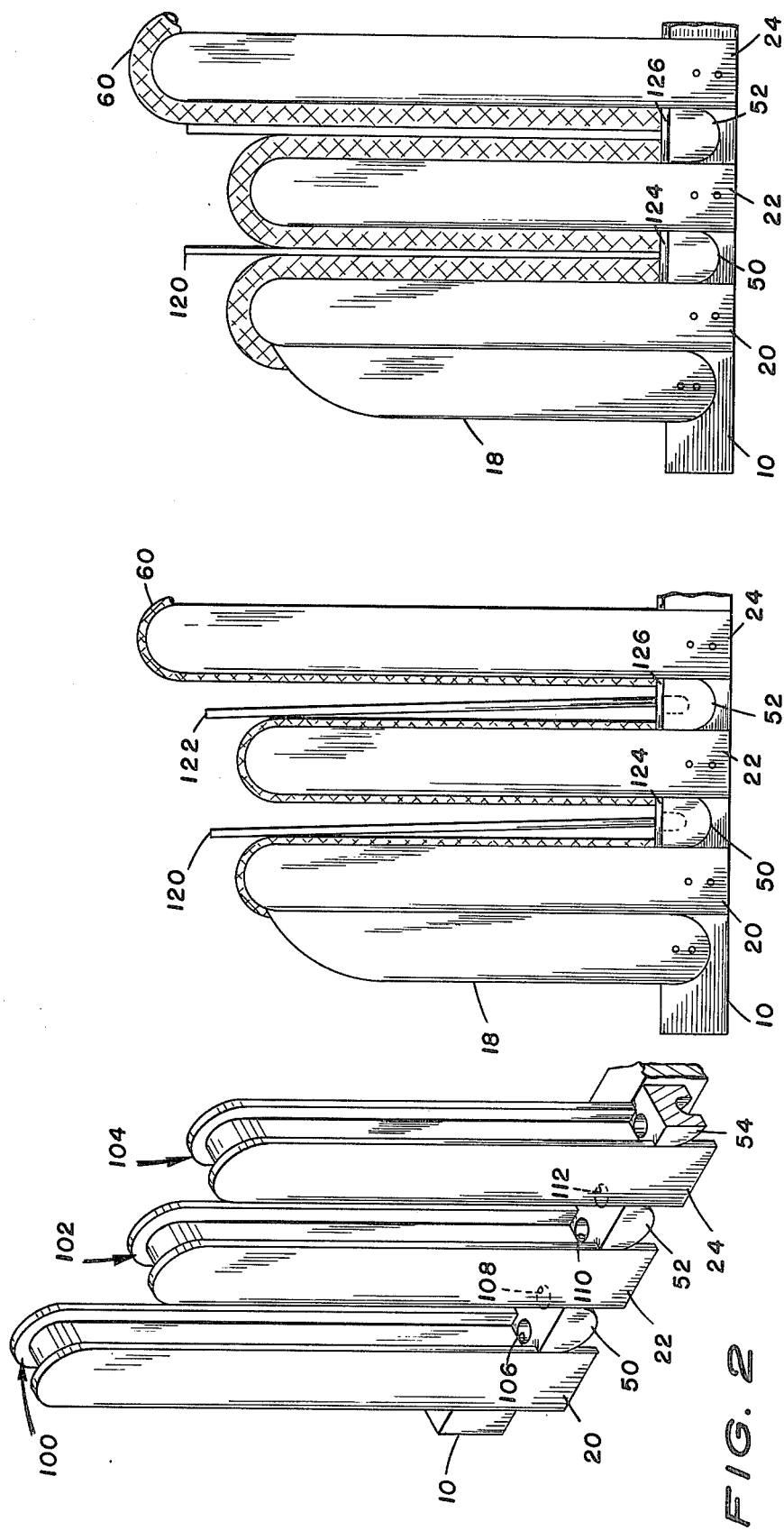

SUPPORTING RACK FOR BREAKABLE ARTICLES

BACKGROUND OF THE INVENTION

The present invention relates to apparatus for transporting glass and, more specifically, to specialized apparatus for transporting large multi-curved glass articles, such as automobile windshields.

When dealing only with flat sheets of glass, transportion does not normally pose a serious problem. In the past, the flat sheets were stacked one on top of another or arranged vertically in rigid containers or boxes for transportation. With the advent of large multi-curved glass articles, such as modern automobile windshields having compound curves, different approaches to transportation had to be developed. This is particularly true in the case of transporting automobile windshields to the individual automobile repair shops, since only infrequently are they the same size or shape and will not permit stacking one on top of another due to the different curvatures of the individual windshields. Accordingly, various approaches to transporting safely these curved automobile windshields have been attempted. Almost all of such attempts have utilized some sort of movable members or the like to mechanically clamp the glass in a position suitable for transporting. Most of these mechanically adjustable clamping systems have proven difficult to use due to the necessity to adapt the clamping pressures of the various holding members to the different shapes of the various glass pieces, which must be held all at one time.

Additionally, many of the mechanically adaptable clamping systems utilize clamping pads employing sponge rubber or the like, which during the clamping operation are almost totally compressed. Since the sponge rubber is compressed during the clamping operation, the cushioning effects thereof are essentially eliminated. Also, many of the previously known windshield transporting apparatus utilize camming arrangements which are rather complex and, in fact, are so mechanically complicated as to make them unreliable and expensive, in light of the relatively simple job of transporting automobile windshields. Also, since many of these prior transporting systems are so complex, it is much too easy to nick the edge of the glass sheet during the placement and removal operation of the glass into and out of the transporting apparatus. Furthermore, several of the already known systems are required to utilize additional rubber inserts which must be placed between the glass and the support members so as to accommodate the various windshield shapes.

BRIEF SUMMARY OF THE INVENTION

The present invention provides apparatus for transporting multi-curved automobile windshields, such apparatus employes upstanding arms or members having grooves, which are intended to have an expandable elastic tubing arranged therein. The tubing is arranged in a serpentine fashion in the interstices formed by the upstanding members. Upon insertion of the glass to be transported in a vertical manner in two opposing intervals or interstices formed by two opposite adjacent pairs of upstanding members, the expandable tubing is pneumatically inflated thereby causing the tubing to expand and contact the major surfaces of the curved glass. When it is desired to remove the glass, the pneumatic tubing is deflated, thereby causing the tubing to recede from contact with the glass. The glass may then be easily removed. A foam cushion of resilient pad is provided at the bottom surface of each of the glass receiving slots formed by the adjacent upstanding members so that the bottom edge of the glass is cushioned when it is being retained in the vertical position.

The upstanding members may be equally spaced along each side or the spacings may vary to accommodate a wider variety of shapes and thicknesses. Similarly, the heights of the upstanding members may be uniform or adjacent and opposite pairs may be taller or shorter, relative to the other members, to further provide increased capabilities to transport differing shapes and sizes of breakable articles. In this regard, the present invention may be utilized to transport safely any breakable article, apart from glass sheets, such as marble, slate, Formica, or the like.

The upstanding members are affixed to a framework which is intended to sit flat, so that it may be easily mounted on the bed of an open truck, or arranged in a closed truck. The framework may also be placed in a closed container or crate for long distance transportation of the breakable articles.

Because the pneumatically inflatable tubing expands until it contacts the glass surface, glasses of various thickness and configurations can be supported and cushioned simultaneously, by means of the inventive transportation apparatus.

A suitable fluid inlet and outlet valve is provided and an additional valve might also be provided to rapidly bleed off the compressed gas contained in the tubing. Also provided is a pressure gauge which may be located in an input manifold, to permit the proper pressure to be placed in the expandable tubing.

Accordingly, it is an object of the present invention to provide a support apparatus for curved automobile windshields, which supports the windshields in a vertical position and simultaneously cushions the windshields against damaging shocks.

It is another object of the present invention to provide a transporting system wherein breakable articles are firmly held and cushioned by means of pneumatically inflatable tubing.

It is a still further object of the present invention to provide a support apparatus for curved glass windshields wherein the pneumatically inflatable tubing accommodates various thicknesses and configurations of glass.

It is another object of the present invention to provide a curved glass transporting apparatus employing a inlet, outlet valve and a pressure gauge for inflating and deflating pneumatic cushioning tubing and for ascertaining the internal pressure thereof.

It is still another object of the present invention to provide a support apparatus for transporting curved glass windshields which is easily mountable in a conventional delivery truck, on the bed of a flat truck, or may be located inside a crate or carton.

BRIEF DESCRIPTION OF THE DRAWINGS

FIG. 2 is a perspective view of a portion of the inventive apparatus of FIG. 1 having the inflatable tubing removed.

FIG. 3A is a side elevation of a portion of the inventive apparatus of FIG. 1, wherein the inflatable tubing is deflated;

FIG. 3B is the side elevation of FIG. 3A wherein the inflatable tubing is inflated.

DETAILED DESCRIPTION OF THE PREFERRED EMBODIMENT

Figure 1:
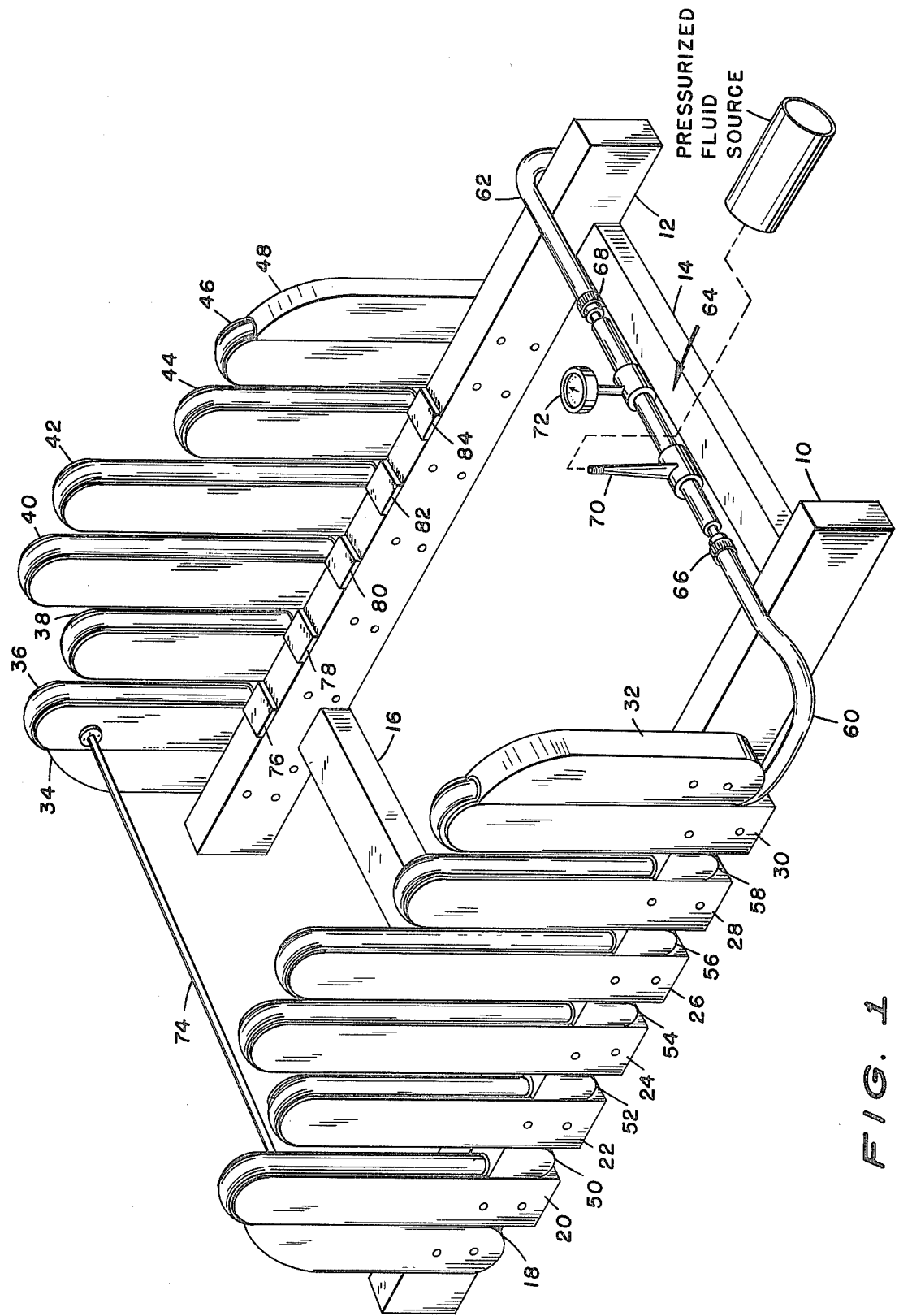
FIG. 1 is a perspective view of the inventive curved glass support apparatus.

Referring now to FIG. 1, the inventive supporting rack is shown in a perspective view having two longitudinal base members 10 and 12 and having cross supports 14 and 16 forming a rigid structure. This rigid structure forms the base for the inventive supporting rack. Attached to longitudinal member 10 are vertical support members 18, 20, 22, 24, 26, 28, 30, and 32. Similarly, attached to longitudinal member 12 are vertical support members 34, 36, 38, 40, 42, 44, 46 and 48. Upstanding members 20, 22, 24, 26, and 28 are substantially identical and are spaced apart one from another by spacing members 50, 52, 54, 56, and 58. Although similar in function to all the vertical support members, members 24, 26, 40 and 42 are of a greater height, in order to adequately protect larger or taller breakable articles. Similarly, although not shown, the spacing between adjacent support members may be varied to accommodate different thickness and configurations of breakable articles. The spacing variations may be achieved by adapting the size of the spacing members, e.g., 50, to provide the desired spacing. The spacing members 50 through 58 have counterparts (not shown) affixed to longitudinal member 12 and serve to space the corresponding upstanding members located opposite the members affixed to longitudinal beam 10. These spacers, 50 through 58, have grooves arranged in their edge surface to accommodate the expandable tubing.

A portion of the expandable tubing is shown at 60 in relation to the frame member 10 and its associated upstanding members 18-32 and, similarly, a second tubing portion is shown at 62 in relation to the corresponding opposing side. It is appreciated, of course, that both sides of the inventive supporting rack structure are identical. The tubing 60 and 62 are connected to a manifold, which may be formed of sections of pipe. The manifold 64 is connected to tubing 60 by a suitable connector and is secured thereto by a hose clamp 66. The tubing may be formed of natural or synthetic rubber or of any suitable plastic. Tubing 62 is also connected to the manifold 64 by means of a second hose clamp 68. Located in fluid communication with the manifold is an inlet/outlet valve stem 70 of the type typically used for truck tire inflation and employing an internal spring loaded valve core. Also in communication with the manifold 64 is a conventional pressure gauge 72 for indicating the internal pneumatic pressure of the tubing.

The ends of tubing segments 60 and 62, which are opposite the connection to the manifold, may be sealed off, thereby creating a sealed system wherein pneumatic pressure applied at the valve stem 70 will equalize over the entire internal volume formed by tubing segments 60 and 62 and manifold 64. Alternatively, and as shown in the embodiment of FIG. 1, the opposite ends of tubings 60 and 62 may be placed in communication by a means of a rigid tube 74. The ends of the rigid tubing member are appropriately connected to the ends of the tubing segments 60 and 62. Use of the tube 74 also adds an additional amount of structural rigidity and, in fact, becomes a structural member in the inventive supporting rack.

In order to cushion the bottom edge of the glass being supported, a resilient shock absorbing pad is provided at each location in the inventive supporting rack where contact may occur between the frame and the glass. These resilient pads are shown affixed to longitudinal member 12 at 76, 78, 80, 82 and 84. It is understood, of course, that identical pads are located opposite the pads that are shown and are affixed to longitudinal member 10.

Although the operation of the embodiment of FIG. 1 will become more apparent from the following discussion of the details of this embodiment, the overall operation of the embodiment may be easily understood from FIG. 1. In operation, the manifold 64 and tubing segments 60 and 62 are opened to ambient pressure by means of the inlet/outlet valve 70. In this regard, an additional valve may be provided in the manifold for very rapid evacuation of the tubing. Upon evacuating the tubing, the glass to be supported is inserted between any two adjacent upstanding members. For example, the glass may be vertically inserted between upstanding members 22 and 24 in the foreground and between members 38 and 40 at the rear. The lower edge of the glass then rests on the resilient pad 78 and the corresponding pad associated with spacing member 52. At that time, the glass is merely resting against whichever one of the upstanding members it happens to lean against. At this time, additional glass pieces are similarly inserted into the appropriate interstrices or, if there is only one piece to be transported, the pressure inside the tubing is caused to be increased. A pressurized fluid source for inflating the tubing is shown diagrammatically connected to the inlet/outlet valve 70. Although the embodiment shown is intended for use with a gas, either compressed air or any inert gas, the inventive supporting rack can also be used with liquid. The source of the compressed gas may be a permanent air compressor or a portable tank or, in fact, it may be a small compressor-type device which may be driven direcly from the intake manifold of the truck.

As will be seen in more detail below, as the tubing is inflated, it expands and the glass windshield is then held captive by the expanded tubing, thereby providing both a support and a resilient cushion to absorb any shocks transmitted to the glass during transportation thereof. As seen in FIG. 1, the tubing portions are arranged in a serpentine fashion over all of the upraised members and under the spacing members, so as to present in each space, intended to receive the glass, two expandable segments of the tubing. The upraised members 18, 32, 34, and 48 are provided to both guide the tubing as it goes on and off the end elements of the upstanding members and to provide additional structural support for the upstanding members to which they are adjacent.

Referring now to FIG. 2, a portion of the embodiment of FIG. 1 is shown with the expandable tubing having been removed therefrom. Specifically, the upstanding members 20, 22, and 24 are shown with the tubing segment 60 having been removed therefrom. Accordingly, it may be seen in upstanding member 20, for example, that a channel 100 is formed to receive the expandable tubing. Similarly, channels 102 and 104 are formed in the upstanding members 22 and 24, respectively. It being understood, of course, that all of the upstanding members are identical, save for the variations in height to accommodate various size breakable articles. The tubing is arranged in these channels in the upstanding members and is then threaded through suitable apertures in the spacing members 50 and 52, for example. In this regard, the apertures may be seen in spacing member 50 at 106 and 108, and in spacing member 52 at 110 and 112. The dashed line in element 50 indicates that there is indeed also an arcuately shaped channel connecting aperture 106 and 108. It is through this channel then that the expandable tubing is fed.

Referring now to FIG. 3A, a portion of the embodiment of FIG. 1 is shown in a side elevation view. Shown additionally in FIG. 3A are two glass sheets, 120 and 122, which have been inserted in the spaces between members 20 and 22, and 22 and 24, respectively. These glass sheets are shown by way of example only, since showing an end view of a multi-curved automobile windshield would be confusing and would obscure the manner in which the glass articles are supported. It is, of course, also understood that the articles being supported need not be glass but may comprise any breakable sheet-type substance which must be safely transported. In the phase of operation shown in FIG. 3A, the glass sheets 120 and 122 have been placed into the appropriate spaces and are resting upon the resilient pads 124 and 126, which could not be seen in the perspective view of FIG. 1 but which are the counterparts of resilient elements 76 and 78 of FIG. 1. In the phase of operation shown in FIG. 3A, the tubing 60 has been exhausted and there is no pneumatic pressure present therein except for atmospheric pressure. As may be seen from FIG. 3A the glass panels, windshields, or whatever, will then only be supported by the relaxed tubing and the upstanding members and, accordingly, will lean against one of the upstanding members, as shown by the placement of the glass sheets 120 and 122.

Turning to FIG. 3B, the expandable tubing is shown having been already inflated, thereby completely filling the space between the upstanding members and the glass sheets 120 and 122. As may be seen, the tubing 60 expands to the point where the tubing is in intimate contact with the glass article which it is supporting. In this manner the glass sheets 120 and 122 are totally cushioned and supported not only by the inflated tubing 60 but also by the pads 124 and 126.

It is understood, of course, that the preceding detailed description is given by way of example only and is not intended to limit the present invention except as recited in the appended claims.

What is claimed is:

1. Apparatus for supporting flat sheet-like breakable articles comprising:
   a base;
   a plurality of elongated members affixed in upstanding relationship to said base and being arranged in two parallel rows of equal number in spaced apart relationship, the spaces between said members in one row cooperating with the spaces between said members in the other row to receive said flat sheet-like articles;
   expandable tubing arranged in a continuous serpentine manner on the facing surfaces of the interstices of adjacent ones of said elongated members, whereby said continuous tubing cooperates with said spaces to define lines of contact between said continuous tubing and said flat sheet-like articles which is substantially the height of said elongated members; and
   manifold means connected to the ends of said tubing and having an inlet for receiving fluid from a pressurized fluid source, whereby said tubing is expanded so as to be brought into contact with substantially the entire line of contact between said upstanding elongated members and said flat sheet-like articles.

2. The apparatus of claim 1 further comprising a plurality of resilient pad means affixed to the top surface of said base and arranged adjacent each space formed by said elongated members, whereby upon insertion of said flat sheet-like articles, the lower edge of said articles will contact said pad means.

3. The apparatus of claim 1 wherein inlet in said manifold means comprise a valve means having an internal valve core.

4. The apparatus of claim 1 further comprising pressure gauge means connected to said manifold means for indicating the internal fluid pressure in the manifold and tube assembly.

5. The apparatus of claim 1 wherein said elongated members are formed with longitudinal grooves in their lateral surfaces for receiving said expandable tubing.

6. The apparatus of claim 1 wherein said plurality of elongated members are formed having different heights and are arranged such that opposite ones of said members affixed to said base are of equal height.

7. Apparatus for supporting flat sheet-like articles comprising:
   a base;
   a plurality of elongated members affixed in upstanding relationship to said base and being arranged in two parallel rows of equal number in spaced apart relationship, the spaces between said members in one row cooperating with the spaces between said members in the other row to receive said flat sheet-like articles;
   expandable tubing arranged on said elongated members in a separate manner in the interstices of said elongated members;
   manifold means connected to the ends of said tubing and having an inlet for receiving fluid from a pressurized fluid source, whereby said tubing is expanded into contact with said flat sheet-like articles; and
   wherein said expandable tubing comprises two sections each section being arranged on one of said rows of elongated members and each section having one end connected to said manifold means, and a rigid tubing member connected at each and to the other ends of said two sections for causing said two tubing sections to be in fluid communication with each other.

8. A supporting rack for sheets of glass, comprising:
   a rectangular base;
   a plurality of elongated members affixed in an upstanding relationship to said base and being arranged in spaced apart relationship on two opposite sides of said base, the members affixed to each side of said base being located opposite each other and forming spaces for receiving said sheets of glass;
   a flexible expandable tubing continuously arranged over the facing surfaces of adjacent ones of said elongated members in a serpentine manner defining two contact areas between said sheets of glass and said tubing, said contact areas extending substantially the entire height of said elongated members;

manifold means connected to the ends of said tubing; and inlet valve means connected to said manifold means and being adapted to receive fluid from a source of pressurized fluid whereby upon said pressurized fluid being fed through said inlet valve means into said manifold said tubing is caused to expand and contact the flat surfaces of said sheets of glass along substantially said entire contact area between said sheets of glass and said tubing.

9. The supporting racks of claim 8 wherein said tubing is formed in two sections, one section being associated with said elongated members on one side of said base one end of each section being connected to said manifold means and the other end of each section being sealed.

10. The supporting rack of claim 8 wherein said fluid is a gas and said inlet valve means comprises a valve stem of the type having an internally arranged one-way valve core for permitting the gas to be fed into the manifold means and for preventing said gas from escaping from said manifold means.

11. The supporting rack of claim 8 wherein said plurality of elongated members are formed having different heights and are arranged such that opposite ones of said members affixed to said base are of equal height.

12. A supporting rack for sheets of glass, comprising;

a rectangular base;

a plurality of elongated members affixed in an upstanding relationship to said base and being arranged in spaced apart relationship on two opposite sides of said base, the members affixed to each side of said base being located opposite each other and forming spaces for receiving said sheets of glass;

a flexible expandable tubing arranged over said elongated members in a serpentine manner;

manifold means connected to the ends of said tubing; and inlet valve means connected to said manifold means and being adapted to receive fluid from a source of pressurized fluid whereby upon said pressurized fluid being fed through said inlet valve means into said manifold said tubing is caused to expand and contact the flat surfaces of said sheets of glass; and wherein said tubing is formed in two sections, one section being associated with said elongated members on one side of said base, one end of each of said sections being connected to said manifold means and the other ends of said sections being connected to a rigid tube, thereby placing said manifold and said two sections of tubing in fluid communication.

* * * * *